United States Patent
Jeon et al.

(10) Patent No.: US 9,419,682 B2
(45) Date of Patent: Aug. 16, 2016

(54) APPARATUS AND METHOD FOR PROVIDING NEAR FIELD COMMUNICATION FOR MOBILE DEVICE

(71) Applicant: ELECTRONICS AND TELECOMMUNICATIONS RESEARCH INSTITUTE, Daejeon (KR)

(72) Inventors: Yong-Sung Jeon, Daejeon (KR); Hong Il Ju, Daejeon (KR); Jeong Nyeo Kim, Daejeon (KR); YoungHo Kim, Daejeon (KR); Yun-Kyung Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 620 days.

(21) Appl. No.: 13/764,703

(22) Filed: Feb. 11, 2013

(65) Prior Publication Data
US 2013/0210348 A1   Aug. 15, 2013

(30) Foreign Application Priority Data
Feb. 10, 2012   (KR) .................. 10-2012-0013667

(51) Int. Cl.
 *H04B 5/00* (2006.01)
(52) U.S. Cl.
 CPC .............. *H04B 5/00* (2013.01); *H04B 5/0031* (2013.01); *H04B 5/0037* (2013.01); *Y02B 60/50* (2013.01)
(58) Field of Classification Search
 CPC ...... H04B 5/00; H04B 5/0031; H04B 5/0037; Y02B 60/50
 See application file for complete search history.

(56) References Cited

U.S. PATENT DOCUMENTS

| | | | | |
|---|---|---|---|---|
| 2007/0075133 A1* | 4/2007 | Yeager | .................... | H04L 63/08 235/380 |
| 2007/0155430 A1* | 7/2007 | Cheon | ............... | H04M 1/72527 455/558 |
| 2007/0164118 A1* | 7/2007 | Degauque | ............ | G06K 7/0008 235/492 |
| 2007/0253251 A1* | 11/2007 | Mizushima | ............ | G06K 19/07 365/185.04 |
| 2009/0006845 A1* | 1/2009 | Charbonnier | ........... | H04L 63/10 713/156 |
| 2009/0108063 A1* | 4/2009 | Jain | ..................... | G06K 7/10237 235/380 |
| 2012/0160909 A1* | 6/2012 | Adams | ................. | G06K 7/0008 235/375 |
| 2013/0090066 A1* | 4/2013 | Marseille | ........... | G07C 9/00111 455/41.2 |

FOREIGN PATENT DOCUMENTS

| | | |
|---|---|---|
| JP | 2008-259200 A | 10/2008 |
| KR | 10-2007-0092390 A | 9/2007 |
| KR | 10-2009-0049795 A | 5/2009 |

* cited by examiner

*Primary Examiner* — Lewis West

(57) ABSTRACT

An apparatus for providing near field communication (NFC) for a mobile device, includes a USB (universal serial bus) signal processing unit configured to convert a signal of the mobile device, which is received through a USB interface into a value to be processed in a central processing unit, and convert a value received from the central processing unit into a signal to be transmitted to the USB interface. Further, the apparatus includes an analog signal processing unit configured to convert an analog signal received from an outside device into a digital signal, and convert a digital signal of the central processing unit into an analog signal to transmit the converted analog signal to the antenna.

4 Claims, 6 Drawing Sheets

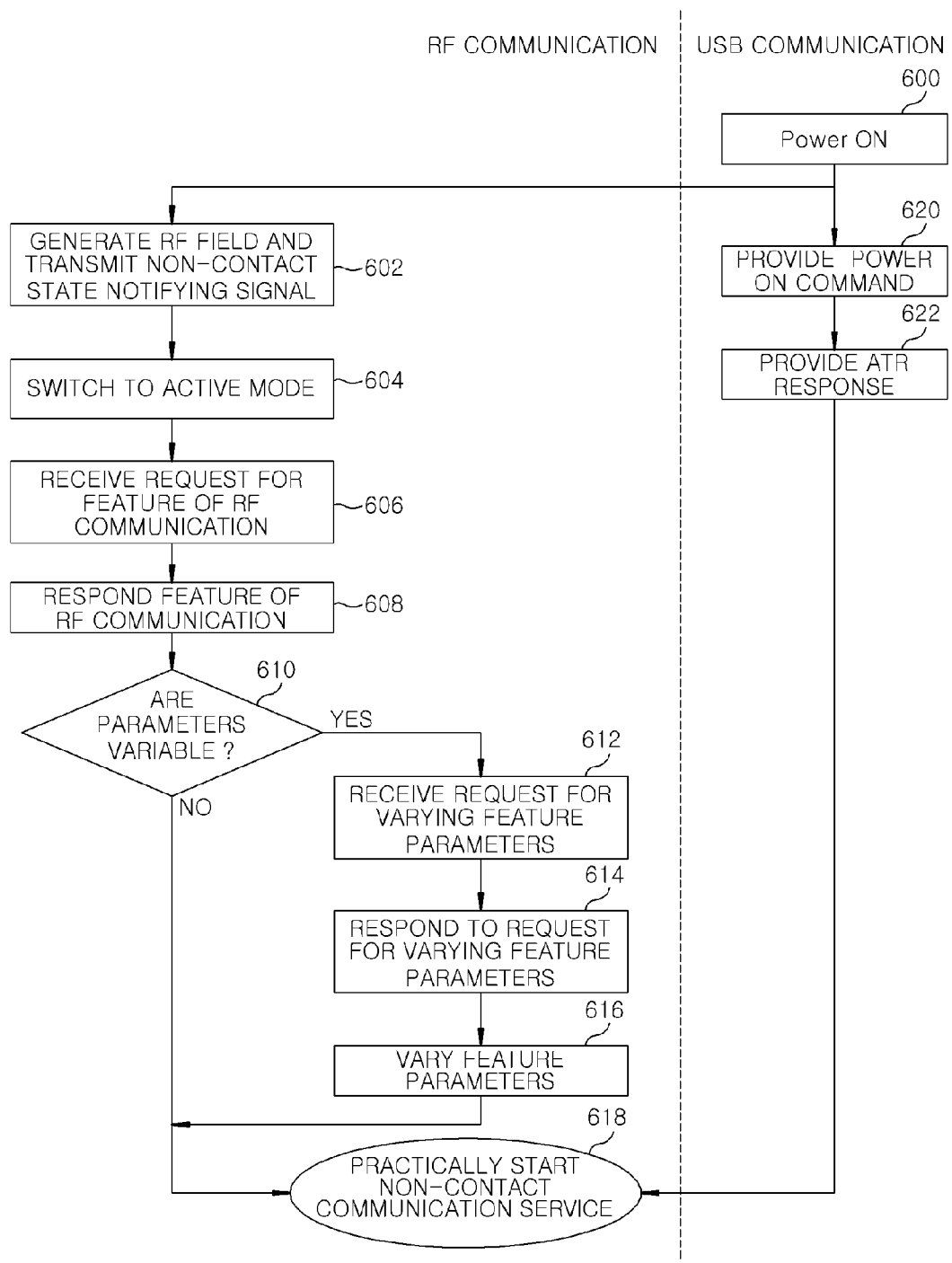

APPARATUS AND METHOD FOR PROVIDING NEAR FIELD COMMUNICATION FOR MOBILE DEVICE

CROSS-REFERENCE TO RELATED APPLICATION(S)

The present invention claims priority of Korean Patent Application No. 10-2012-0013667, filed on Feb. 10, 2012, which is incorporated herein by reference.

FIELD OF THE INVENTION

The present invention relates to a near field communication technology of a mobile device such as a smart phone and the like; and more particularly, to an apparatus and a method for providing near field communication (contact type or non-contact type) for the mobile device, which are suitable for being loaded (USB connection) in the mobile device in a chip or an IC card type to perform high-speed communication and implementing the near field communication with an outside device using RF (Radio Frequency).

BACKGROUND OF THE INVENTION

Recently, an IC card using a non-contact type communication method which performs necessary functions each time the IC card reaches to a card reader has been widely employed in various fields, in addition to a contact-type communication method in which the IC card is inserted in the card reader to perform the necessary functions. The IC card is employed in a mobile device such as a smartphone to perform a user authentification, and the mobile device employed in the mobile device has provided only a function of contact type communication. Recently, the smartphone has used an NFC (Near Field Communication) technology to enable a non-contact communication service.

The conventional RFID (Radio-Frequency Identification) method passively processes data while being provided with power by an RF field generated from outside. On the other hand, the NFC technology may enable a user to conveniently use the non-contact communication service even in a mobile device such as the smartphone using non-contact communication technology. Further, a device for the NFC may be a kind of a passive RFID tag and may directly generate an RF filed to input and output information from/to the RFID of outside.

However, the NFC technology is implemented to allow only the non-contact communication technology and an IC card serving as a SIM (Subscriber Identity Module) card which is necessary to charge a mobile device is separately loaded therein. Further, a separate serial interface using the SWP (Single Wire Protocol) is employed to communicate between the IC card and an NFC chip. Furthermore, the SIM card internally has security function in hardware to securely store important information of a customer and that which is necessary for encryption.

Likewise, in order to provide the non-contact communication service, a secure element serving as a security storage device in hardware which enables customer information and the important information necessary for the data encryption to be securely stored is required.

The secure element described above may be created using a module within the SIM card, or may be created using a separate chip. However, functions required for the non-contact communication service are dispersed in various chips in any of the above cases, which cause time to be unnecessarily consumed for communicating between the various chips and power consumption of the mobile device to become high.

In particular, in order to provide the non-contact communication service in the mobile device such as the smartphone, various chips need to be provided within the mobile device. As a result, power consumption of the mobile device becomes high and service efficiency thereof becomes deteriorates due to communication between the various chips.

Therefore, it is necessary to implement an apparatus for the NFC, which is capable of minimizing the power consumption for the non-contact communication service and maximizing efficiency of power management.

SUMMARY OF THE INVENTION

In view of the above, the present invention provides an apparatus for providing NFC, which is single chip or IC card type by transmitting and receiving data using USB (universal serial bus) interface to enable high-speed communication with a mobile device, and using the NFC using RF (Radio Frequency) for communicating with an outside device to integrate function of the SIM card and that of the NFC.

Specifically, the present invention may maximize efficiency of the non-contact communication service by integrating the conventional SIM card and function of the NFC, and may maximize efficiency of communication with the mobile device using the USB interface when performing the non-contact communication service.

For example, when the mobile device in which the apparatus for providing NFC in accordance with the present invention is employed becomes close to a non-contact card reader, the non-contact communication is performed between the apparatus for providing NFC and the non-contact card reader. Further, if the apparatus for providing the NFC notifies that the non-contact communication is performed to the mobile device, a USB communication may be performed between the apparatus for providing the NFC and the mobile device. That is, the present invention provides an apparatus for providing the NFC which is the single chip or the IC card type and method thereof, which are capable of enabling the non-contact communication service to be performed in the mobile device using only singe device.

In accordance with a first aspect of the present invention, there is provided an apparatus for providing near field communication (NFC) for a mobile device. The apparatus includes a USB (universal serial bus) signal processing unit configured to convert a signal of the mobile device, which is received through a USB interface into a value to be processed in a central processing unit, and convert a value received from the central processing unit into a signal to be transmitted to the USB interface; and an analog signal processing unit configured to convert an analog signal received from an outside device into a digital signal, and convert a digital signal of the central processing unit into an analog signal to transmit the converted analog signal to the antenna.

Here, the analog signal processing unit may detect a RF (radio frequency) field generated from the outside device and generate a signal for generating a logical value while the RF field is maintained in the outside device.

Further, the analog signal processing unit may output the signal for generating the logical value to outside to notify that wireless communication is performed to the mobile device connected to the USB interface.

Further, the analog signal processing unit may be provided with power from a RF field generated by the outside device and generate a signal for generating the logical value while the RF field is maintained in the outside device to transmit the generated signal to the mobile device connected to the USB interface.

Further, the analog signal processing unit may be provided with the power required to operate the apparatus for providing the NFC from the mobile device connected to the USB interface while the signal for generating the logical value is maintained.

Further, the apparatus may further comprise a non-contact digital signal processing unit configured to convert the digital signal converted by the analog signal processing unit into a value which is to be calculated by the central processing unit, verify a CRC (Cyclic Redundancy Check) value of the digital signal and convert the value processed by the central processing unit into a digital signal to generate and transmit the CRC value of the digital signal; and a memory controller configured to process data transmitted to and received from the mobile device through the USB interface and data transmitted to and received from the outside device.

Further, the apparatus for providing the NFC may be a chip or an IC card type.

In accordance with a second aspect of the present invention, there is provided an apparatus for providing near field communication (NFC) for a mobile device. The apparatus includes a USB (universal serial bus) signal processing unit configured to convert a signal of the mobile device that is received through a USB interface into a value which is to be processed in a central processing unit, and convert the value received from the central processing unit into a signal which is to be transmitted to the USB interface; an interface of a contact-type IC card, which is configured to serve as an interface of one of a contact reset signal, a contact I/O (input/output) signal and a contact clock; a contact serial signal processing unit configured to convert the digital signal received from the interface of the contact-type IC card into a value which is to be processed in the central processing unit, and convert the value processed the central processing unit into a digital signal; and an analog signal processing unit configured to convert an analog signal wirelessly received from an outside device through an antenna, and convert the digital signal of the central processing unit into an analog signal to transmit the converted analog signal to the antenna.

Further, the apparatus may further comprise a non-contact digital signal processing unit configured to convert the digital signal converted by the analog signal processing unit into a value which is to be calculated by the central processing unit, verify a CRC (Cyclic Redundancy Check) value of the digital signal and convert the value processed by the central processing unit into a digital signal to generate and transmit the CRC value of the digital signal; and a memory controller configured to process data transmitted to and received from the mobile device through the USB interface and data transmitted to and received from the outside device.

Further, the contact serial signal processing unit may include a function of selecting two signals which are to be connected to terminals connected to outside among the contact clock signal and contact I/O signal, and a signal for the antenna for wirelessly transmitting and receiving signal to and from the outside device using the contact reset signal.

Further, the contact serial signal processing unit: when a logical value of the contact reset signal is a first logical value, may connect the contact clock signal and the contact I/O signal to the terminal connected to the outside; and when the logical value of the contact reset signal is a second logical value or there is no electric signal, may connect the two signals for the antenna to the terminal connected to the outside.

Further, the apparatus for providing the NFC may be a chip or an IC card type.

In accordance with a third aspect of the present invention, there is provided a method for providing near field communication (NFC) for a mobile device. The method includes outputting a logical value for notifying that a non-contact signal is detected when a RF (radio frequency) signal from outside is detected through an antenna while power is not provided from a mobile device; after the power is provided by the mobile device which checks that the non-contact signal is detected by the logical value, receiving a command notifying that the power is provided by the mobile device through a data line of a USB interface; and after a command notifying that the power is provided, transmitting ATR (answer to reset) serving as a response command thereto to the mobile device.

Further, the method may further comprise after said outputting a logical value is performed, receiving a request for feature of a RF communication from an outside device; responding the feature of the RF communication in response to the request for the feature from the outside device; if feature parameters of the RF communication are variable, receiving a request for varying the feature parameters from the outside device; and responding to the request for varying the feature parameters of the feature of the RF communication, and varying the feature parameters requested from the outside device.

In accordance with a fourth aspect of the present invention, there is provided a method for providing near field communication (NFC) for a mobile device. The method includes generating an RF (radio frequency) field in outside through an antenna using the power provided by the mobile device connected through a USB (universal serial bus) interface; transmitting a request for feature of a RF communication to an outside device; if there is a response to the request for the feature of the RF communication from the outside device, determining whether feature parameters are variable; if it is determined that the feature parameters are variable, transmitting a command of request for varying the feature parameters to the outside device; and after a response command notifying a request for varying the feature parameters of the RF communication is received from the outside device, varying the feature parameters of the RF communication and performing the RF communication using the varied feature parameters.

Further, the method may further comprise after the power is provided from the mobile device, receiving a command of notifying that power is provided from the mobile device connected to a USB interface through a data line thereof; and receiving a command of the power on through the data line of the USB interface and transmitting an ATR (answer to reset) serving as a response command thereto.

In accordance with the present invention, bidirectional communication, i.e., communication using USB interface and non-contact communication using RF are simultaneously enabled using the apparatus for providing NFC, thus a mobile device such as a smartphone may perform a function of charging for the non-contact service and the like using a chip or an IC card. That is, a plurality of devices (chips) is necessary for the non-contact communication service in the related art, but the non-contact communication service may be provided using one apparatus for providing the NFC in accordance with the present invention. Accordingly, power consumption of the mobile device for providing the non-contact communication service may be minimized and efficiency of management may be maximized.

BRIEF DESCRIPTION OF THE DRAWINGS

The objects and features of the present invention will become apparent from the following description of preferred embodiments given in conjunction with the accompanying drawings, in which:

FIG. 6 is a flow chart showing operation procedures in an active mode of an apparatus for providing NFC for a mobile device in accordance with an embodiment of the present invention.

DETAILED DESCRIPTION OF THE EMBODIMENTS

Figure 1:
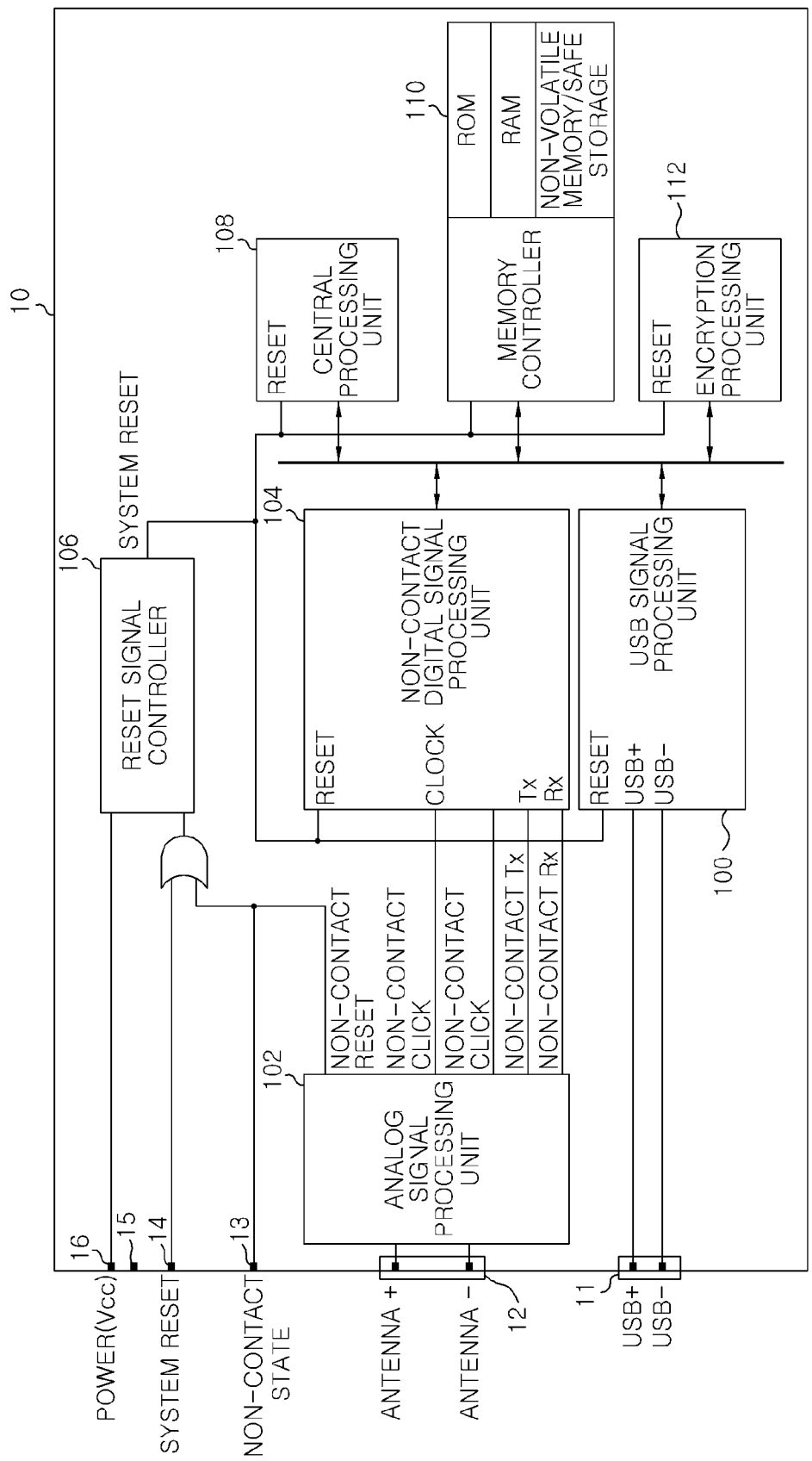
FIG. 1 is a block diagram showing an apparatus for providing near filed communication (NFC) for a mobile device, which has functions of processing a non-contact signal and processing a USB signal in accordance with an embodiment of the present invention.

Advantages and features of the invention and methods of accomplishing the same may be understood more readily by reference to the following detailed description of embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims. Like reference numerals refer to like elements throughout the specification.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms need to be defined throughout the description of the present invention.

Combinations of each step in respective blocks of block diagrams and a sequence diagram attached herein may be carried out by computer program instructions. Since the computer program instructions may be loaded in processors of a general purpose computer, a special purpose computer, or other programmable data processing apparatus, the instructions, carried out by the processor of the computer or other programmable data processing apparatus, create devices for performing functions described in the respective blocks of the block diagrams or in the respective steps of the sequence diagram. Since the computer program instructions, in order to implement functions in specific manner, may be stored in a memory useable or readable by a computer aiming for a computer or other programmable data processing apparatus, the instruction stored in the memory useable or readable by a computer may produce manufacturing items including an instruction device for performing functions described in the respective blocks of the block diagrams and in the respective steps of the sequence diagram. Since the computer program instructions may be loaded in a computer or other programmable data processing apparatus, instructions, a series of processing steps of which is executed in a computer or other programmable data processing apparatus to create processes executed by a computer to operate a computer or other programmable data processing apparatus, may provide steps for executing functions described in the respective blocks of the block diagrams and the respective sequences of the sequence diagram.

Moreover, the respective blocks or the respective sequences may indicate modules, segments, or some of codes including at least one executable instruction for executing a specific logical function(s). In several alternative embodiments, is noticed that functions described in the blocks or the sequences may run out of order. For example, two successive blocks and sequences may be substantially executed simultaneously or often in reverse order according to corresponding functions.

Prior to description of the embodiment, an apparatus for providing NFC in accordance with an embodiment of the present invention is installed to a mobile device, communicates with the installed mobile device by USB communication and performs the NFC with outside devices using RF (radio frequency). Accordingly, communication information transmitted and received between the outside device and the apparatus is transmitted to a mobile device through a USB. The object of the present invention may be easily obtained by the scope of the present invention.

Hereinafter, embodiments of the present invention will be described in detail with reference to the accompanying drawings which form a part hereof.

FIG. 1 is a block diagram schematically showing an apparatus 10 for providing the NFC for a mobile device.

The apparatus 10 for providing the NFC for the mobile device may include a USB interface 11, an antenna terminal 12, a non-contact signal terminal 13, a reset terminal 14, a ground terminal 15, a power terminal 16, a USB signal processing unit 100, an analog signal processing unit 102, a non-contact digital signal processing unit 104, a reset signal controller 106, a central processing unit 108, a memory controller 110 and a encryption processing unit 112.

The apparatus 10 for providing the NFC for the mobile device may be provided in the mobile device (not shown), e.g., a smartphone and perform USB communication with the mobile device. Further, the apparatus 10 for providing the NFC for the mobile device, which is employed in an embodiment of the present invention, may be implemented by a chip or an IC card type.

As shown in FIG. 1, the USB interface 11 may serve as an interface for the USB communication with the mobile device (not shown) and the antenna terminal 12 may be connected to an antenna (not shown) of the mobile device.

The USB signal processing unit 100 may convert signal of the mobile device that is received through the USB interface 11 into a value which is to be processed in the central processing unit 108. Further, the USB signal processing unit 100 may convert the value received from the central processing unit 108 to be described later into a signal which may be transmitted to the USB interface 11.

The analog signal processing unit 102 may be connected to the antenna terminal 12 to which an antenna of the mobile device is connected and may convert an analog signal wirelessly received from the outside device, e.g., an RF fixed device through the antenna of the mobile device into a digital signal. Further, the analog signal processing unit 102 may convert a digital signal received from the non-contact digital signal processing unit 104 into an analog signal to transmit the converted analog signal to the antenna through the antenna terminal 12. Further, the analog signal processing unit 102 may detect an analog signal, e.g., a RF signal generated from the outside device and may generate a signal for generating a logical value, e.g., '1' while the RF signal is maintained in the outside device. The signal may be output to the outside to notify that wireless communication is performed to the mobile device connected to the USB interface 11.

Further, the analog signal processing unit 102 may be provided with power from the RF signal generated by the outside device and may generate a signal for generating the logical value '1' only while the RF signal is maintained in the outside signal and transmit the generated signal to the mobile device connected to the USB interface 11. Therefore, when the signal has the logical value '1', the power required to operate an entire system may be provide from the mobile device connected to the USB interface 11.

The non-contact digital signal processing unit 104 may convert the digital signal converted by the analog signal processing unit 102 into a value which may be calculated by the central processing unit 108, and may verify a CRC (Cyclic Redundancy Check) value of the received digital signal. Further, the non-contact digital signal processing unit 104 may convert the value processed by the central processing unit 108 into a digital value to transmit the converted digital value, and may generate and transmit the CRC value of the digital signal.

The reset signal controller 106 may generate a system reset signal in response to a non-contact reset signal generated by the analog signal processing unit 102.

The central processing unit 108 may process a signal (hereinafter, referred as a first signal) which is transmitted and received through the USB interface 11 and an analog signal (hereinafter, referred as a second signal) which is transmitted to and received from an outside device.

The memory controller 110 may be connected to the central processing unit 108 and provide information required to control it thereto, or may temporally store the first signal or the second signal therein. Further, the memory controller 110 may include, e.g., ROM (Read Only Memory), RAM (Random Access Memory), non-volatile memory and the like.

The encryption processing unit 112 may be connected to the central processing unit 108 and memory controller 110 and may participate in the encryption process of the apparatus 10 for providing the NFC. Further, as shown in FIG. 1, when non-contact communication service is provided, a non-contact reset signal, a non-contact clock signal, a non-contact transmission signal Tx and the like may be generated from a signal generated from the antenna in the analog signal processing unit 102. Here, the non-contact reset signal may be input to the reset signal controller 106. The non-contact reset signal generated in the analog signal processing unit 102 may be used as an input signal for generating a system reset signal of the reset signal controller 106 and may be transmitted to the mobile device via the non-contact signal terminal 13 to be used as a non-contact state notifying signal for notifying that a non-contact signal is detected.

When the non-contact state notifying signal has the logical value '1' in the mobile device, the mobile device may detect that the non-contact communication is performed and perform initialization therefor. Further, the mobile device may provide power with the apparatus 10 for providing the NFC in accordance with the present invention and allow entire elements of the apparatus 10 for providing the NFC such as the central processing unit 108, the USB signal processing unit 100, the memory controller 110, encryption processing unit 112 and the like other than the analog signal processing unit 102 to be operated, thereby enabling the USB communication.

The embodiment described above is an example in which the apparatus 10 for providing the NFC is operated in a manual mode. The non-contact communication service may begin even if the power as much as only the analog signal processing unit 102 may be operated is provided. On the other hand, when the apparatus 10 for providing the NFC needs to be operated in an active mode, the non-contact communication service may be enabled by providing the power with the apparatus 10 for providing the NFC from the mobile device and generating an RF field through the antenna using the provided power.

Figure 2:
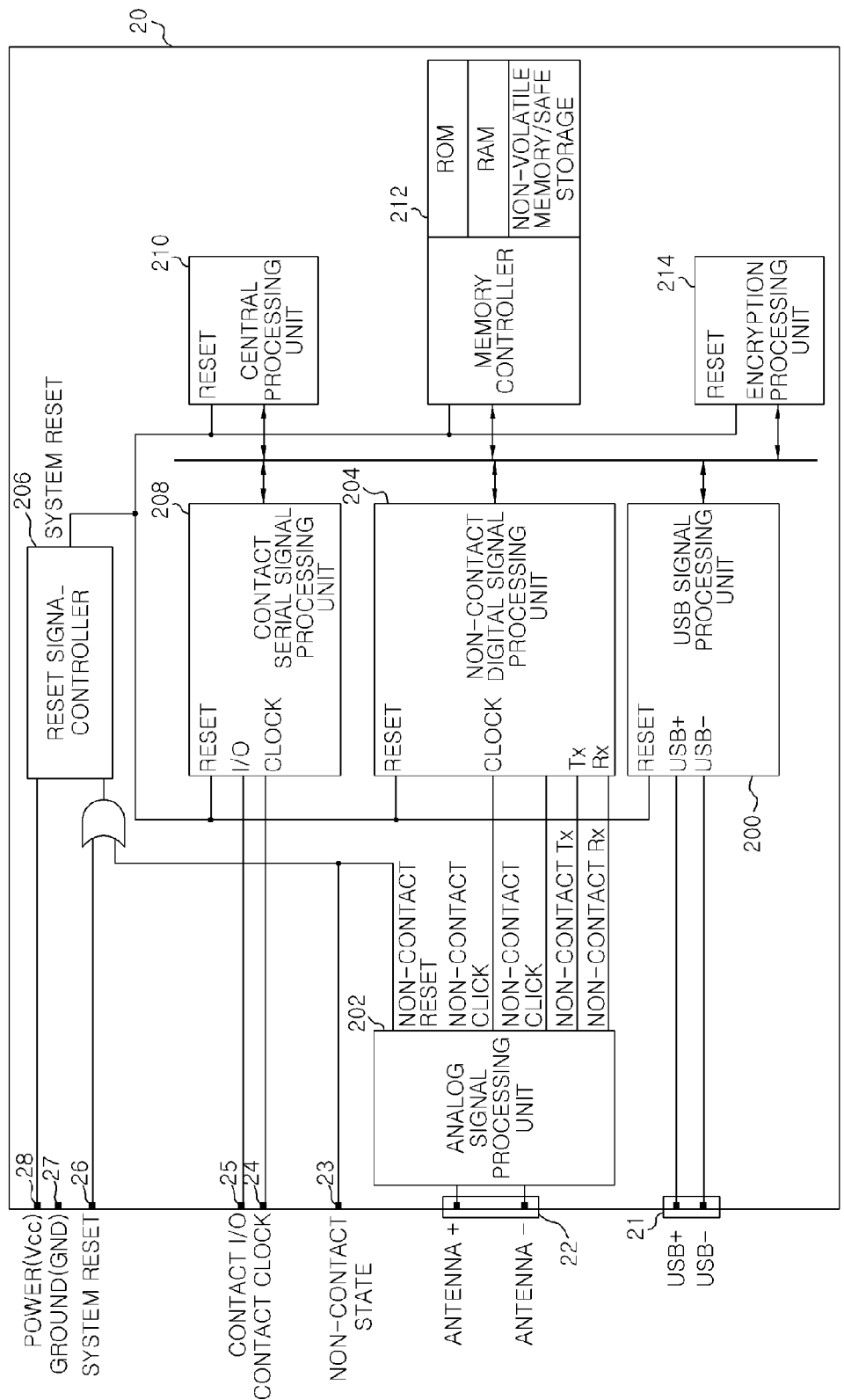
FIG. 2 is a diagram showing an apparatus for providing NFC for a mobile device, which has a function of a contact serial signal processing in addition to functions of non-contact signal processing and USB signal processing in accordance with another embodiment of the present invention.

FIG. 2 is a diagram showing an apparatus for providing NFC for a mobile device and may include a USB interface 21, an antenna terminal 22, a non-contact signal terminal 23, a contact clock terminal 24, a contact I/O terminal 25, a contact reset terminal 26, a ground terminal 27, a power terminal 28, a USB signal processing unit 200, an analog signal processing unit 202, a non-contact digital signal processing unit 204, a reset signal controller 206, a contact serial signal processing unit 208, a central processing unit 210, a memory controller 212, an encryption processing unit 214 and the like.

Comparing to the embodiment shown in FIG. 1, the embodiment shown in FIG. 2 further includes the contact serial signal processing unit 208 which is capable of processing contact standard interface signal. In order to highlight features of the embodiment, description of repetitive configuration shown in FIG. 1 will be omitted.

When the non-contact communication service is performed, as shown in FIG. 2, the non-contact reset signal, non-contact clock signal, non-contact transmission signal Tx and the like may be generated by the signal generated from the antenna in the analog signal processing unit 202. Here, the non-contact reset signal may be input the reset signal controller 206. The non-contact reset signal which is generated by the analog signal processing unit 202 may be used as an input signal for generating a system reset signal of the reset signal controller 206, and also may be transmitted to the mobile device via the non-contact signal terminal 23 to be used as the non-contact state notifying signal for notifying that the non-contact signal is detected.

When the non-contact state notifying signal has the logical value '1' in the mobile device, the mobile device may detect that the non-contact communication is performed and perform initialization therefor. Further, the mobile device may provide power with the apparatus 20 for providing the NFC in accordance with the present invention and allow entire elements of the apparatus 20 for providing the NFC such as the central processing unit 210, the USB signal processing unit 200, the contact serial signal processing unit 208, the memory controller 212, encryption processing unit 214 and the like other than the analog signal processing unit 202 to be operated, thereby enabling communication through the USB interface and contact interface. The USB interface and the contact interface may be selectively used.

The embodiment shown in FIG. 2 is an example in which the apparatus 20 for providing the NFC is operated in a manual mode. On the other hand, when the apparatus 20 for providing the NFC needs to be operated in the active mode, the non-contact communication service may be enabled by providing the power with the apparatus 20 for providing the NFC from the mobile device and generating the RF field through the antenna using the provided power.

Figure 3:
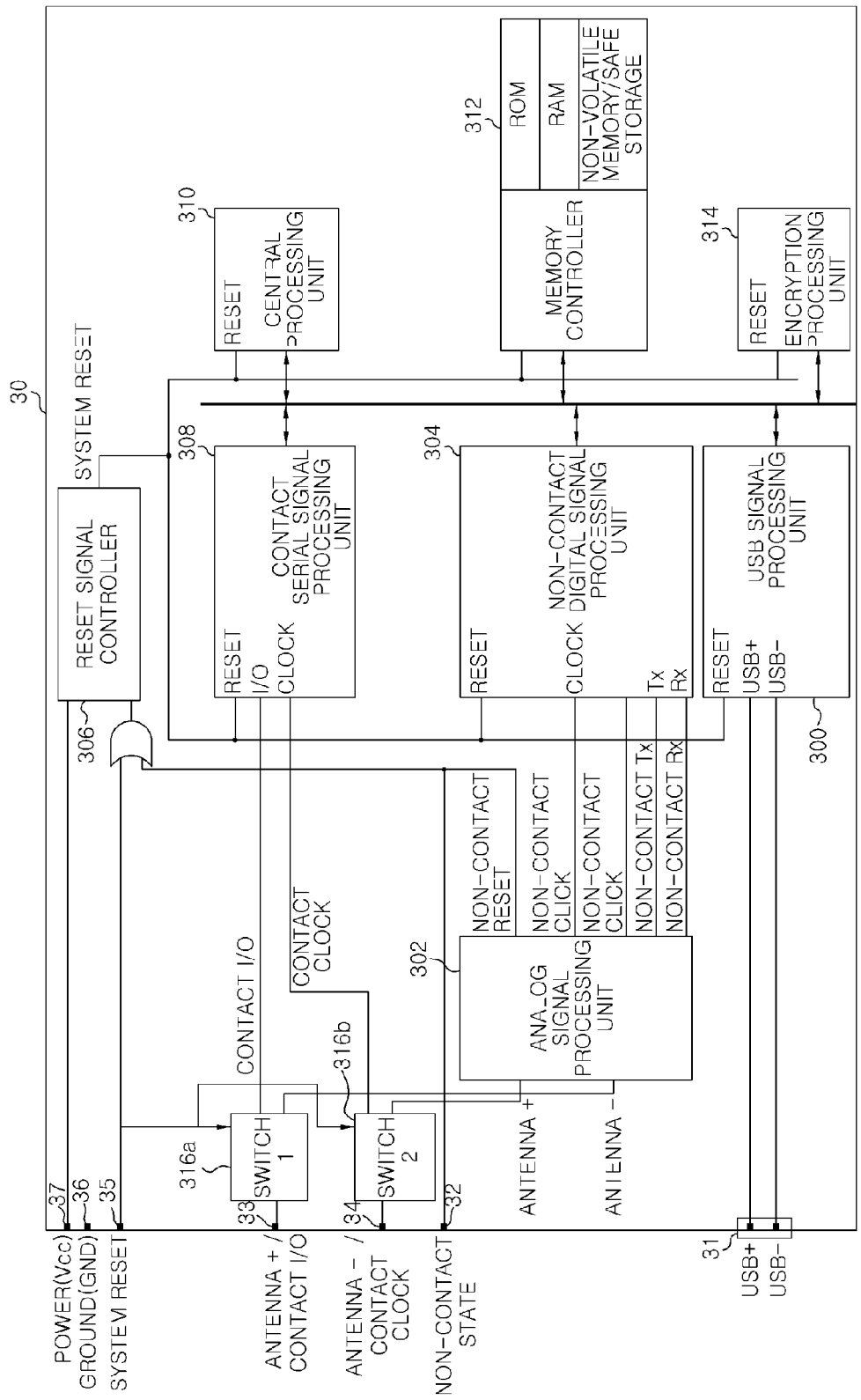
FIG. 3 is a diagram showing an apparatus for providing NFC for a mobile device, which has a function of a contact serial signal processing in addition to functions of non-contact signal processing and USB signal processing and may select one of the functions of non-contact signal processing and contact serial signal processing in accordance with another embodiment of the present invention.

FIG. 3 is a diagram showing an apparatus for providing the NFC for the mobile device in accordance with another embodiment of the present invention. The apparatus for providing the NFC for the mobile device may include a USB interface 31, a non-contact signal terminal 32, a contact I/O terminal 33, a contact clock terminal 34, a contact reset terminal 35, a ground terminal 36, a power terminal 37, a USB signal processing unit 300, an analog signal processing unit 302, a non-contact digital signal processing unit 304, a reset signal controller 306, a contact serial signal processing unit 308, a central processing unit 310, a memory controller 312, an encryption processing unit 314 and the like.

The apparatus 30 for providing the NFC for the mobile device in accordance with another embodiment of the present invention, which is shown in FIG. 3, describes a method for limiting the number of terminals connected to outside to eight so that the apparatus 20, shown in FIG. 2, for providing the NFC may match an existing standard of an IC card.

As shown in FIG. 3, two signals which may be connected to the terminals connected to the outside are selected among two signals of the contact clock and contact I/O, and two signals for the antenna for wirelessly transmitting and receiving signal to and from an outside device using the contact reset signal serving as an interface of a contact-type IC card. For example, when the logical value of the contact reset signal serving as the interface of the contact-type IC card is '1', the contact clock signal and the contact I/O signal may be connected to the terminal connected to the outside. Further, when the logical value of the contact reset signal is '0' or there is no electric signal, the two signals for the antenna may be connected to the terminal connected to the outside.

When the non-contact communication service is used, it is difficult to use the contact interface. On the other hand, when the non-contact communication service is not used, the existing method in which the USB interface and the contact interface are selectively used may be used without change.

Figure 4:
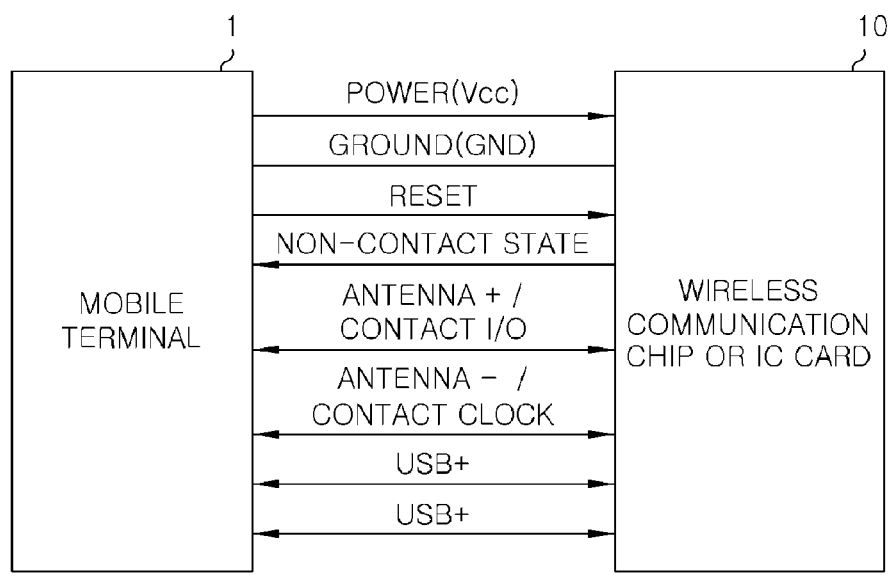
FIG. 4 is a diagram showing a configuration of connection to an outside device of an apparatus for providing NFC for a mobile device in accordance with an embodiment of the present invention.

FIG. 4 is a diagram showing only signals of contact points between a mobile device and an IC card when the apparatus 30, shown in FIG. 3, for providing the NFC for the mobile device is provided to a slot of the IC card in the mobile device as the IC card type.

Referring to FIG. 4, an antenna+signal and a contact I/O signal are shared by one terminal, and an antenna−signal and a contact clock signal are shared by one terminal. However, it is an exemplary embodiment and the antenna+signal and the contact clock signal may be shared by one terminal, and the antenna−signal and the contact I/O signal may be shared by one terminal.

Hereinafter, operation procedures of the apparatus for providing the NFC for the mobile device in accordance with the present invention will be described in detail with reference to FIGS. 5 and 6.

Figure 5:
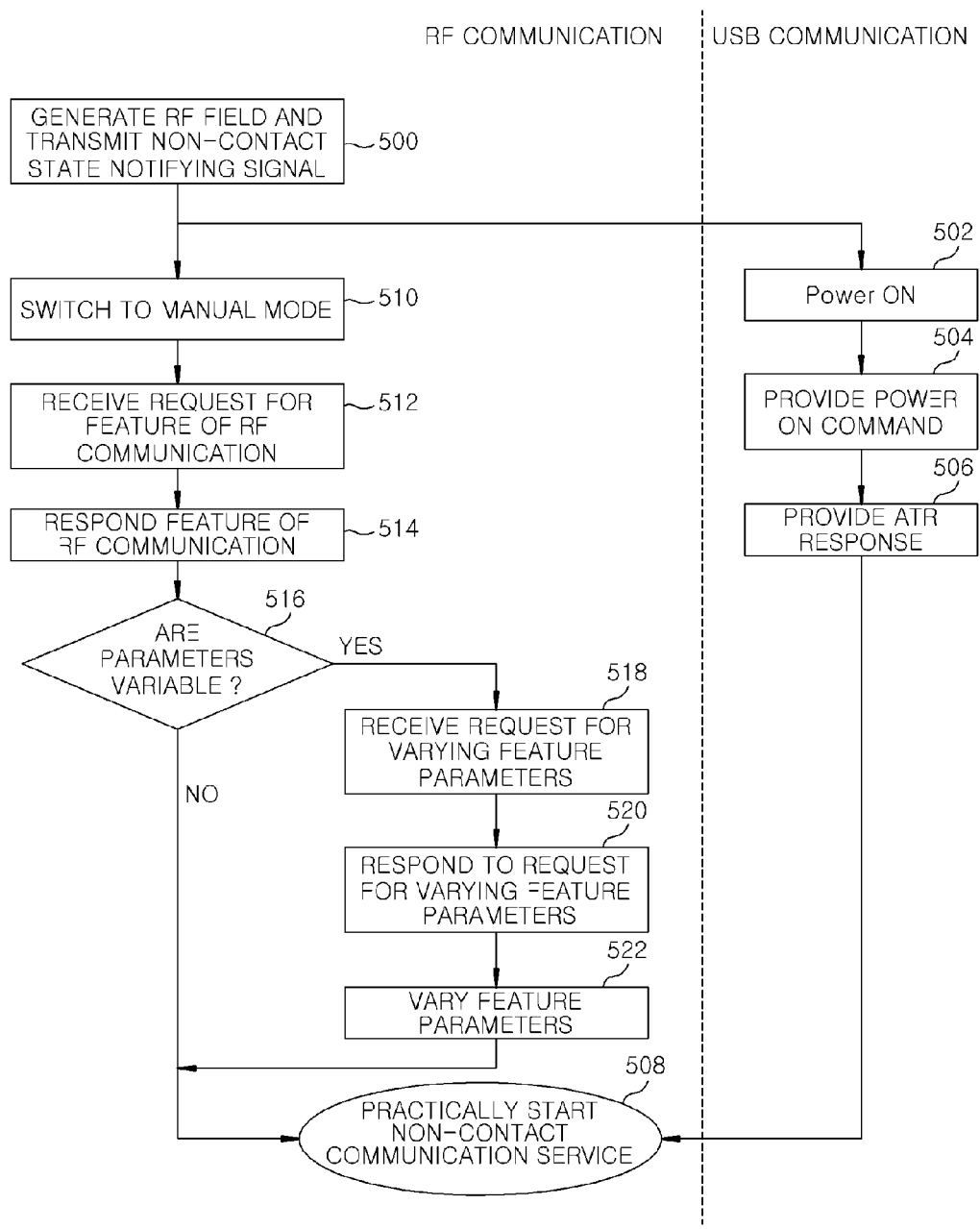
FIG. 5 is a flow chart showing operation procedures in a manual mode of an apparatus for providing NFC for a mobile device in accordance with an embodiment of the present invention.

FIG. 5 is a flow chart showing operation procedures in a manual mode of the apparatus for providing the NFC for the mobile device in accordance with an embodiment of the present invention;

As shown in FIG. 5, when the RF field is generated by the outside device while the apparatus for providing the NFC for the mobile device is not provided with power by the mobile device, the analog signal processing unit 102 may be operated by the power generated by the antenna. Accordingly, the non-contact state notifying signal may have the logical value '1', and may be transmitted to the mobile device connected through the USB interface 11 using a separate signal line other than a USB in operation 500.

The apparatus for providing the NFC in accordance with the present invention is provided with the power (i.e., power on) by the mobile device which checks that the non-contact state notifying signal has the logical value '1' in operation 502. Then, a command notifying that the power is provided by the mobile device through a data line of the USB interface 11 may be provided in operation 504.

Thereafter, the USB signal processing unit 100 receives command notifying that the power is provided and provides an ATR (Answer TO Reset) serving as a response command thereto in operation 506 and then the non-contact communication service may be practically started in operation 508.

The processes described above are performed between the apparatus for providing the NFC in accordance with the present invention and the mobile device connected through the USB interface 11. Further, operation process with the outside device which communicates using the RF may be simultaneously performed.

First, after operation 500 described above and switching to a manual mode in operation 510, the apparatus for providing the NFC in accordance with the present invention may receive a request for feature of the RF communication from the outside device in operation 512.

In operation 514, the apparatus for providing the NFC in accordance with the present invention may respond the feature of the RF communication in response to the request for feature from the outside device. If feature parameters of the RF communication are variable in operation 516, the apparatus for providing the NFC may receive a request for varying the feature parameters from the outside device in operation 518. The apparatus for providing the NFC in accordance with the present invention may respond to the request for varying the feature parameters of the feature of the RF communication in operation 520, vary the feature parameters in operation 522 and practically start the non-contact communication service in operation 508.

As describe above, in accordance with an embodiment of the present invention, data transmitted and received between the apparatus for providing the NFC and the outside device using the RF may be transmitted to and received to and from the mobile device connected with the USB interface to be processed in the mobile device as well as may be processed in the apparatus for providing the NFC.

FIG. 6 is a flow chart showing operation procedures in an active mode of an apparatus for providing NFC for a mobile device in accordance with an embodiment of the present invention.

As shown in FIG. 6, the apparatus 10 for providing the NFC is provided with power (i.e., power on) by a mobile device connected through the USB interface 11 in operation 600, and then generates an RF field in the outside through an antenna using the provided power in operation 602. Then, the apparatus 10 for providing the NFC determines transmission speed of data and switches an operation mode thereof to an active mode in operation 604 and transmits a request for feature of the RF communication to the outside device in operation 606.

If there is a response to the request for the feature of the RF communication from the outside device in operation 608, the apparatus 10 for providing the NFC determines whether feature parameters are variable in operation 610. If it is determined that the feature parameters are variable in operation 610, the apparatus 10 for providing the NFC may transmit a command of request for varying the feature parameters to the outside device in operation 612.

On the other hand, if it is determined that the feature parameters are not variable in operation 610, the apparatus 10 for providing the NFC may start the non-contact communication service in operation 618.

A response command notifying a request for varying the feature parameters of the RF communication is received from the outside device in operation 614, the feature parameters of the RF communication are varied in operation 616, and the apparatus 10 for providing the NFC performs the RF communication using the varied feature parameters in operation 618.

The processes described above are performed between the apparatus 10 for providing the NFC in accordance with an embodiment of the present invention and the outside device which communicates using the RF, and processes between the apparatus 10 for providing the NFC and the mobile device connected thereto through the USB interface 11 may be also simultaneously performed as described below.

First, the apparatus 10 for providing the NFC in accordance with an embodiment of the present may receive a command of notifying that power is provided with (i.e., power on) from the mobile device connected to the USB interface 11 through the data line thereof in operation 600.

The apparatus 10 for providing the NFC may receive a command of the power on through the data line of the USB interface 11 in operation 620, transmit the ATR (answer to reset) in operation 622 and start the non-contact communication service in operation 618.

Through the operations described above, if the non-contact communication and USB communication is simultaneously activated, the mobile device may directly receive the data input to the apparatus for providing the NFC from the outside device through the RF when performing the non-contact communication service. Further, the mobile device may transmit the data to the apparatus for providing the NFC in accordance with an embodiment of the present invention through the USB interface and may transmit the transmitted data to the outside device through the RF.

In accordance with an embodiment of the present invention, it is possible to provide an apparatus for providing the NFC, which is single chip or an IC card type to integrate function of the SIM card and that of the NFC.

Specifically, it is possible to maximize efficiency of the non-contact communication service by integrating the conventional SIM card and function of the NFC, and also possible to maximize efficiency of communication with the mobile device using the USB interface when performing the non-contact communication service.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A method for providing near field communication (NFC) for a mobile device, wherein the method is performed by an NFC providing apparatus, the NFC providing apparatus being employed in the mobile device, including a universal serial bus (USB) interface, and being connected to an antenna employed in the mobile device, the method comprising:
   detecting a radio frequency (RF) signal generated from an external device of the mobile device through the antenna while power is not provided to the NFC providing apparatus by the mobile device;
   outputting a logical value for notifying that a non-contact signal is detected when the RF signal is detected while power is not provided by the mobile device, the logical value being transmitted to the mobile device;
   being provided with power by the mobile device which checks that the non-contact signal is detected by the logical value;
   receiving a command notifying that the power is provided by the mobile device through a data line of the USB interface; and
   transmitting ATR (answer to reset) serving as a response to the command to the mobile device after the command notifying that the power is provided is received.

2. The method of claim 1, further comprising:
   after said outputting a logical value is performed, receiving a request for feature of a RF communication from the external device;
   responding the feature of the RF communication in response to the request for the feature from the external device;
   if feature parameters of the RF communication are variable, receiving a request for varying the feature parameters from the external device; and
   responding to the request for varying the feature parameters of the feature of the RF communication, and varying the feature parameters requested from the external device.

3. A method for providing near field communication (NFC) for a mobile device, wherein the method is performed by an NFC providing apparatus, the NFC providing apparatus being employed in the mobile device, including a universal serial bus (USB) interface, and being connected to an antenna employed in the mobile device, the method comprising:
   generating an RF (radio frequency) field in outside through the antenna using power provided to the NFC providing apparatus by the mobile device connected through the USB interface;
   transmitting to an external device of the mobile device, a request for feature of an RF communication between the NFC providing apparatus and the external device;
   determining whether feature parameters of the RF communication are variable if there is a response to the request for the feature of the RF communication from the external device;
   transmitting a request for varying the feature parameters to the external device if it is determined that the feature parameters are variable; and
   after a response notifying that the feature parameters are varied is received from the external device, performing the RF communication using the varied feature parameters.

4. The method of claim 3, further comprising:
   being provided with power by the mobile device;
   receiving a command of notifying that the power is provided by the mobile device through a data line of the USB interface; and
   receiving a command of the power on through the data line of the USB interface and transmitting an ATR (answer to reset) serving as a response to the command to the mobile device.

* * * * *